United States Patent
Condon et al.

(10) Patent No.: US 11,849,194 B1
(45) Date of Patent: Dec. 19, 2023

(54) SYSTEMS AND METHODS TO BROADCAST A SEASONALLY AND GEOGRAPHICALLY CURATED INSTRUCTIONAL CHANNEL OVER DBS

(71) Applicant: DISH Network L.L.C., Englewood, CO (US)

(72) Inventors: Caroline Condon, Denver, CO (US); Brandon Halper, Aurora, CO (US); Shane Oesterle, Greenwood Village, CO (US); Morgan Kirby, Palmer Lake, CO (US)

(73) Assignee: DISH Network L.L.C., Englewood, CO (US)

( * ) Notice: Subject to any disclaimer, the term of this patent is extended or adjusted under 35 U.S.C. 154(b) by 0 days.

(21) Appl. No.: 17/839,782

(22) Filed: Jun. 14, 2022

(51) Int. Cl.
| | |
|---|---|
| *H04N 21/61* | (2011.01) |
| *H04N 21/41* | (2011.01) |
| *H04N 21/435* | (2011.01) |
| *H04N 21/433* | (2011.01) |

(52) U.S. Cl.
CPC ..... *H04N 21/6143* (2013.01); *H04N 21/4126* (2013.01); *H04N 21/433* (2013.01); *H04N 21/435* (2013.01)

(58) Field of Classification Search
CPC .......... H04N 21/6143; H04N 21/4126; H04N 21/433; H04N 21/435
See application file for complete search history.

(56) References Cited

U.S. PATENT DOCUMENTS

| | | | |
|---|---|---|---|
| 2011/0102158 A1* | 5/2011 | Haughawout | G05B 11/01 |
| 2011/0302443 A1* | 12/2011 | Lakshminarayanan | G06F 1/12 |
| 2016/0073171 A1* | 3/2016 | Wessel | H04N 21/4882 |

* cited by examiner

*Primary Examiner* — Anthony Bantamoi
(74) *Attorney, Agent, or Firm* — Perkins Coie LLP (57) ABSTRACT

Techniques are provided that include receiving, by a set-top box (STB) and over a direct broadcast satellite (DBS) channel, an instructional media file; storing the instructional media file in a local database for future viewing; adding metadata about the instructional media file to an analytics engine; determining, by the analytics engine, a time to present the instructional media file to an end-user associated with the STB, wherein the determination is based on processing an associated profile of the end-user and the metadata about the instructional media file; transmitting a notification for delivery to the end-user, where the notification indicates that the instructional media file is ready to be presented; and presenting, by a local processor associated with the STB, the instructional media file. Various artificial intelligence and augmented reality aspects are created and implemented in the system.

17 Claims, 6 Drawing Sheets

SYSTEMS AND METHODS TO BROADCAST A SEASONALLY AND GEOGRAPHICALLY CURATED INSTRUCTIONAL CHANNEL OVER DBS

TECHNICAL FIELD

The present disclosure relates to a channel broadcast over direct broadcast satellite (DBS), and more specifically, to a channel broadcast over DBS that contains seasonally and geographically-relevant instructional media content.

BACKGROUND

Typically, when consumers, students, or curious individuals want to know how to do a task, they search online for an instructional video. For example, an online user wanting to know how to install winter tires may search for videos on various video-sharing or social media platforms, such as, but not limited to, YouTube (San Bruno, CA) and TikTok (Culver City, CA). However, it has been found that sometimes the ability to view or play an instructional video is limited by constraints such as data. For instance, in rural areas with little home internet or with strict data caps (e.g., for some satellite internet customers), it can be difficult or impossible for an individual to watch an online instructional video.

SUMMARY

In some embodiments, a method can include receiving, by a set-top box (STB) and over a direct broadcast satellite (DBS) channel, an instructional media file; storing, by the STB, the instructional media file in a local database for future viewing; adding, by a local processor associated with the STB, metadata about the instructional media file to an analytics engine; determining, by the analytics engine, a time to present the instructional media file to an end-user associated with the STB, wherein the determination is based on processing an associated profile of the end-user and the metadata about the instructional media file; transmitting, by a local processor associated with the STB, a notification for delivery to the end-user, wherein the notification indicates that the instructional media file is ready to be presented; and presenting, by a local processor associated with the STB, the instructional media file.

In some embodiments, a system can include one or more processors and one or more memory devices having instructions stored thereon, which when executed by the one or more processors the instructions cause the one or more processors to: receive, by a set-top box (STB) and over a direct broadcast satellite (DBS) channel, an instructional media file; store, by the STB, the instructional media file in a local database for future viewing; add, by a local processor associated with the STB, metadata about the instructional media file to an analytics engine; determine, by the analytics engine, a time to present the instructional media file to an end-user associated with the STB, wherein the determination is based on processing an associated profile of the end-user and the metadata about the instructional media file; transmit, by a local processor associated with the STB, a notification for delivery to the end-user, wherein the notification indicates that the instructional media file is ready to be presented; and present, by a local processor associated with the STB, the instructional media file.

In some embodiments, one or more non-transitory computer-readable media storing computer-executable instructions that, when executed by one or more processors, can cause the one or more processors to perform operations, the operations can include receiving, by a set-top box (STB) and over a direct broadcast satellite (DBS) channel, an instructional media file; storing, by the STB, the instructional media file in a local database for future viewing; adding, by a local processor associated with the STB, metadata about the instructional media file to an analytics engine; determining, by the analytics engine, a time to present the instructional media file to an end-user associated with the STB, wherein the determination is based on processing an associated profile of the end-user and the metadata about the instructional media file; transmitting, by a local processor associated with the STB, a notification for delivery to the end-user, wherein the notification indicates that the instructional media file is ready to be presented; and presenting, by a local processor associated with the STB, the instructional media file.

DETAILED DESCRIPTION

The present disclosure relates to a channel broadcast over direct broadcast satellite (DBS), and more specifically, to a channel broadcast over DBS that contains seasonally and geographically-relevant instructional media content.

Typically, when consumers, students, or curious individuals want to know how to do a task, they search online for an instructional video. For example, an online user wanting to know how to install winter tires may search for videos on various video-sharing or social media platforms, such as, but not limited to, YouTube (San Bruno, CA) and TikTok (Culver City, CA). However, it has been found that sometimes the ability to view or play an instructional video is limited by data constraints. For instance, in rural areas with little home internet or with strict data caps (e.g., for satellite internet customers), it can be difficult or impossible for an individual to watch an online instructional video.

Overview

The above-cited problems are addressed herein by a solution (e.g., configured online platform, system, or method) that provides an instructional channel (e.g., a YouTube how-to channel) that is broadcast over DBS. In an embodiment, such channel contains seasonally and geographically-relevant how-to videos. Examples of such videos may include "How to Install Winter Tires," "How to Avoid Heat Stroke," and "How to Winterize Hoses." It should be appreciated that these titles are exemplary and are not meant to be limiting. Further, it should be appreciated that the innovation also may be referred to herein as "system," "platform," and/or "method" interchangeably. The term and concept of video is by way of example and can be interchangeable with other suitable forms of media such as, but not limited to, audio (e.g., for the sight-challenged end-user) or with subtitles (e.g., for the hearing-challenged). Further, the term "user" and "end-user" can be used interchangeably.

Consistent with embodiments herein, the system is configured to enable an individual to walk around the house pointing their phone camera at appliances to provide or obtain further information. The system processes an artificial intelligence and/or machine learning algorithm (AI/ML)-based image recognition and prediction system that identifies the appliances and/or other items for which the individual might need help (e.g., predict help on maintaining the appliance) or want to provide additional information (e.g., add a note about the appliance such as indicating that a part has been replaced). As an example, the individual can point their camera to the outside gutters of the house and the system recognizes and flags the gutters (e.g., either visually with an overlay check or literal flag over the gutters in a stored image of the outside of the house or internally with a programmed indicator for the gutters that allows the AI/ML processor to perform a post-flag operation). Responsive to identifying and/or flagging the gutters, the system is configured to provide an instructional videos related to the gutters such as, but not limited to, cleaning the gutters, fixing the gutters, or replacing the gutters.

Further and consistent with embodiments herein, the system is configured to provide an augmented reality (AR) overview that shows the customer what devices and/or house elements the system is tagging and allows the customer to enter additional information in an interactive mechanism. For example, the customer can enter into a text field, "Our gutters are always clogged!" or "Our last car oil change was Aug. 2, 2021". In an embodiment, the note can be intended for the end-user as a reminder. In another embodiment, the AI/ML mechanism processes the information within the note. More specifically, notes are available to the customer on demand, meaning the system allows the customer to check what they have written. Also, the system is configured to send the note or content thereof to the customer the next time the customer accesses a video (e.g., when the customer receives a video about tire winterization, such transmittal ca also be delivered with text. As an example, such text can recite: "Remember, last time you said [content of note]." In another embodiment, the note is added as additional information for the AI engine. In the example above, the system is trained to more likely send videos related to e.g., de-clogging gutters or installing leaf shields if either (i) the picture the customer took showed a lot of clogging in the gutters (visually identified) or (ii) the customer entered a comment such as "our gutters are always clogged!". Thus, consistent with embodiments herein, the system combines text and visual input such as depicted above to enhance and train AI and/or machine learning object recognition. Example screenshots of AR overlays are described in detail hereinbelow.

Further and consistent with embodiments herein, the system is configured to ask the end-user for additional data about clarification. An example question is "How old is your air conditioning unit? A) Before 2014; B) After 2014; or C) I don't know." The system is configured to request videos or photos to be uploaded or captured on the user's camera. For example, if the AI/ML system recognizes that the user has a particular brand's refrigerator, but does not know the model, the system is configured to highlight where the pertinent informational sticker on the refrigerator is located and can present a question asking the user to point their camera to that location on their appliance.

Consistent with embodiments herein, the system processes device fingerprinting information from the gateway to identify the make and model of devices in the home. For instance, the system processes fingerprinting information from the gateway on any devices or elements that are on the Wi-Fi. Further, the system is configured, responsive to identifying and processing fingerprint information from the gateway on a device or element, to send customized instructional media about the technology. For example, the system is configured to send technology ("tech") how-to videos or other media (e.g., auditory recordings). As another example, if the system detects that an end-user is employing an out-of-date version of their browser on their laptop, the system can provide (e.g., secure a recording and transmit via DBS) a video on how to install updates to the browser.

Consistent with embodiments herein, the system is configured to be able to identify devices by identifying and recognizing their traffic patterns and processing appropriate predictions. For example, if an end-user has a device in their house that communicates consistently with some devices (e.g., temperature control devices, such as Nest Thermostat by Google Inc., Mountain View, CA) in the same patterns as the fire alarms devices (e.g., Nest Protect smoke and carbon monoxide alarms by Google), the system is configured to send the end-user a video about how to change the batteries of the alarm devices, in response to and based on identifying and recognizing such traffic patterns.

Consistent with embodiments herein, the system is configured to integrate in partnership with online retailers for such partners or retailers to send or otherwise provide the end-user how-to media for products just ordered. For example, if an end-user has just bought a 3000-piece assembly-required bicycle for their child's birthday, the system is configured to transmit an assembly helper video proximate temporally to when the bicycle arrives, where the video was provisioned by the associated retailer to be transmitted over the DBS. Typically, in an embodiment, third-party content is transmitted via a satellite provisioner's product/system and it not bypassed, meaning is not transmitted over the DBS directly by the retailer to the end-user. One reason is that typically fewer unique videos are served over the satellite than over internet and which is one reason why efficient curation can be desired. Thus, in an embodiment, a third-party would not be given access to independently take control of one of the satellite proprietor's channels, without going through a coordination system provisioned by the satellite provider. It is contemplated that such embodiment encompasses an automated approval process. As an example, on purchase of the bike, the third-party forwards the satellite provider's API (e.g., the innovative system's API) a request including the video or more likely a link to such video, the delivery date and the recipient. Each video request (including video requests generated by the AI system described above) is assigned points based on several factors such as but not limited to: needed-by date, importance (e.g., public safety videos such as "How to set up a generator safely" during a cold snap), urgency (e.g., winterizing hoses when the first hard freeze is expected that same night=high urgency, rotating tires=low urgency), reach (videos that are needed by multiple people get more points that videos needed by only one person), recipient's internet speed (videos sent to households' with very slow internet prioritized over recipients' who are more likely to have internet adequate to just stream the videos over IP), and possibly business considerations (e.g., prioritizing videos from partner companies, or letting the third-party bid on prioritization of each video they request, etc.). In an embodiment, the system monitors or detects the video slots available on the satellite, and picks the ones for broadcast that maximize the total number of points of the videos sent. In an embodiment, such processing occurs in the back-end server 114 of FIG. 1.

Consistent with embodiments herein, the system is configured to reschedule the delivery, the availability, or the presenting of videos based on the informational data the system processes about the product/topic of the video in combination with whether the end-user has viewed it. For example, if the end-user watched a video about changing their snow tires on their 2021 car (e.g., 2021 Jeep Cherokee), the system is configured to recognize that such video was watched and be preprogrammed to preferentially return to tire-changing videos in the spring, as opposed to having the recommendations algorithm start showing or continue to show more similar content, when the end-user just changed their tires and may not want to view more videos about tire changing.

Exemplary Embodiments

Figure 1:
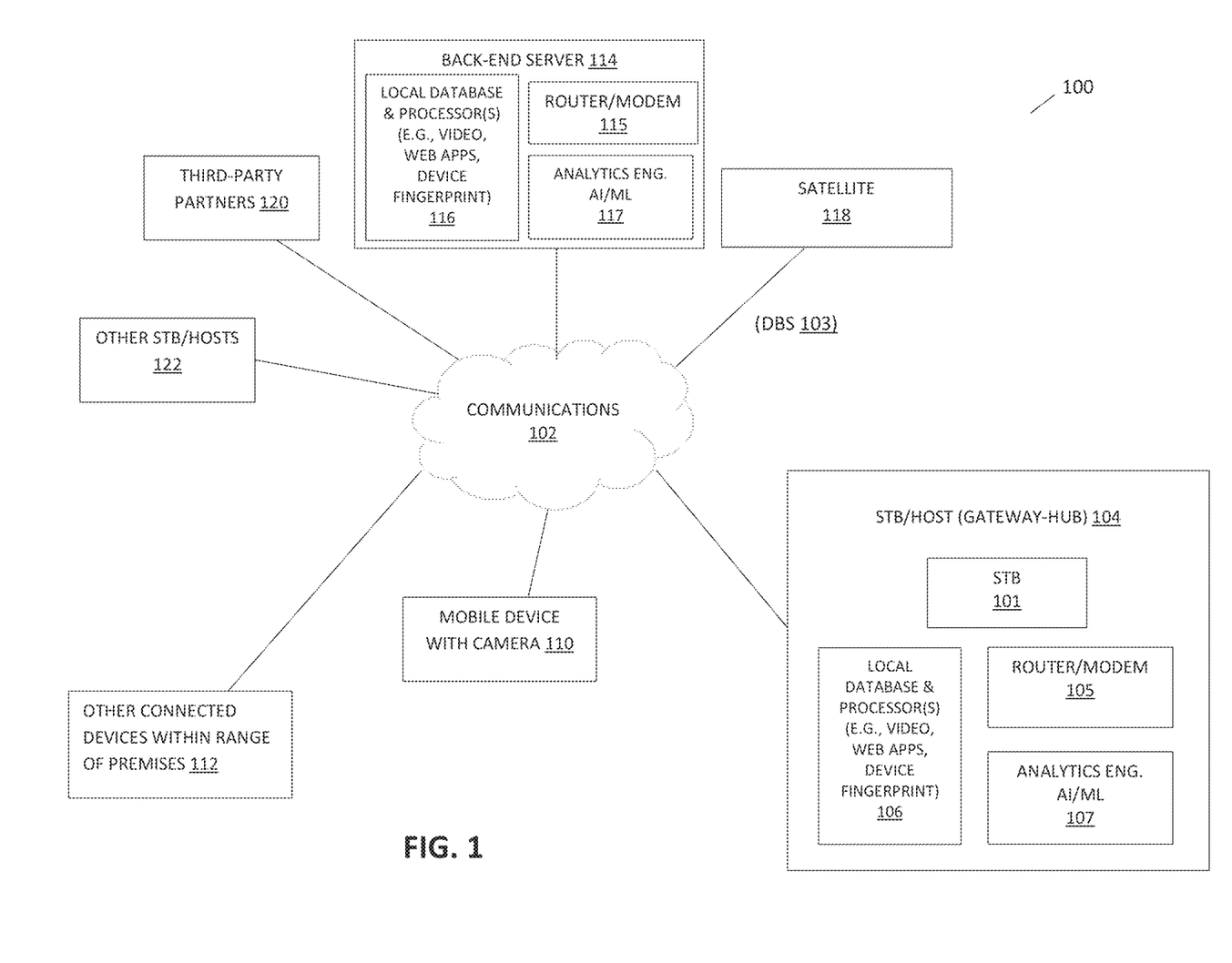
FIG. 1 is a schematic diagram of a high-level architecture of the network environment, in accordance with an embodiment.

An embodiment can be understood with reference to FIG. 1, a schematic diagram of a high-level architecture of the network environment 100. In accordance with a prearranged agreement or package, a back-end server 114 prepares and broadcasts an educational video or channel via a satellite 118, e.g., over direct broadcast satellite (DBS) 103, for delivery to a set-top box (STB) 101, whereupon the STB 101 is configured to present the educational video to end-users. In an embodiment, STB 101 is included in a gateway or hub (e.g., STB/Host 104) that includes a local database and processor (collectively shown as 106), that is configured to store the broadcast educational video for future viewings. It should be appreciated that herein references the STB/Host 104 may be referred to as STB and its meaning as gateway or hub can be readily understood in context by a person skilled in the art. Further, in an embodiment, STB 104 also comprises an analytics engine 107 that may contain artificial intelligence (AI) algorithms and/or machine learning (ML) algorithms that are configured to process informational data (e.g., video content data and video metadata) about the video. In an embodiment, STB 104 includes an internet router and/or modem (collectively shown as 105) that are configured to enable the STB 104 to act also as a host, hub, or gateway by handling internet traffic into, within, and out of the proximal area (for example, the house for when the STB/Host 104 resides in a home). In an embodiment, the back-end server 114 contains one or more of the same type of components (115, 116, and 117) to mirror the processing and storage power that was just described for the STB/Host 104. The STB/Host 104 and the back-end server 114 can communication via the network, as depicted by communications 102 (to be described in detail hereinbelow). In an embodiment, communications 102 also represents the DBS connection between satellite 103 and STB/Host 104. In an embodiment, STB/Host 104 is also communicably connected via communications 104 with other devices 112 within or in range of the premises, such as but not limited to home temperature devices. In an embodiment, STB/Host 104 is also communicably connected via communications 104 with one or more mobile devices 110 that contain a digital camera. In an example, mobile device 110 is configured to take and upload digital pictures of appliances in the household to the STB/Host 104 or to the back-end server 114, for further processing regarding the educational video. In an embodiment, STB/Host 104 is communicably connected via communications 102 to other STB/Hosts 122, for example, for sharing the downloaded educational video to avoid redundant storage of such. In an embodiment, either of the back-end server 114 or the STB/Host 104 is communicably connected with third-party partners or vendors 120, for example, to enable such third-party vendors to provision the educational video to the back-end server 114 for delivery to satellite 118 to broadcast or to provide the video directly to the STB/Host 104, for example upon a vendor 120 learning that the end-user associated with the STB/Host 104 had just purchased their product, the message to the vendor 120 being propagated by the back-end server 114.

In an embodiment, communications component 102, as shown, is a logical representation of how each element (104, 110, 112, 114, 118, 120, and 122) may be communicably connected with another element (104, 110, 112, 114, 118, 120, and 122). The communications component 102 represents one or more mechanisms for delivering commands and information between such components. Communications component 102 may be one or more of various wired or wireless communication mechanisms, including but not limited to any desired combination of wired (e.g., cable and fiber) and/or wireless (e.g., cellular, wireless, satellite (e.g., DBS), microwave, and radio frequency) communication mechanisms and any desired network topology (or topologies when multiple communication mechanisms are utilized). Exemplary communication networks include wireless communication networks, local area networks (LAN) such as a WiFi network or Ethernet, and/or wide area networks (WAN), such as the Internet, etc. Further, communications component 102 can be part of a private network, a mobile communication system, a terrestrial television network, a cable television network, and/or a satellite television network.

In addition to the one or more communications components 102 mechanisms discussed above, communications component 102 may represent one or more wired or wireless direct connections. Direct connections may include e.g., Bluetooth, Universal Serial Bus (USB), high-definition multimedia interfaces (HDMI), and custom serial interfaces.

In an embodiment, STB/Host 104 is configured to have the hardware and/or software to perform the functions of a STB (e.g., STB 101); to comprise a local storage (persistent or temporary or both) and one or more processors that are configured to execute instructions that are stored in memory (collectively or singularly referred to as component 106); to comprise a router and/or modem (collectively or singularly referred to as component 105); and an analytics engine that may include AI and/or ML capabilities 107. Sub-components (101, 105, 106, and 107) may reside in the same, larger device or may be distributed. For example, the STB sub-component may be one component beneath a television set, while the router/modem may be a separate device nearby by not within the STB component. Other combinations are contemplated and within the scope of the innovation.

In an embodiment, STB/Host 104 is a data box that streams content. In another embodiment, the STB/Host 104 is a hub that talks or communicates, via communications component 102, with other Internet of Things (IoT) devices 112 and/or the mobile device 110.

In an embodiment, STB/Host 104 is equipped with various wired and wireless network interfaces such as an Ethernet module, an external or integrated Wi-Fi module, an ultra-wide band (UWB) module and/or a Bluetooth module.

The STB can also be equipped with coax, fiber, composite video, and/or high-definition multimedia interface (HDMI). An illustrative example of STB/Host 104 may be the Hopper® set top box device available from DISH Network L.L.C. of Englewood, Colorado. Another example of STB/Host 104 is the DISH Anywhere application that operates on a mobile phone or tablet. The disclosed technology is not limited to the Hopper environment and equivalent concepts could be applied in any number of other products from any number of other suppliers.

In an embodiment, STB/Host 104 is equipped with IP ports that can provide dual connectivity via satellite and IP. Embodiments of the disclosed technology can be owned and operated by media companies such as a cable company, a satellite broadcasting company, a television network, an on-demand media streaming service, a pay-per-view media streaming service, and/or an over-the-top media streaming service. Other aspects, implementations, objects, and advantages of the disclosed technology will be apparent based on the following drawings and detailed description.

In an embodiment, the local database 106 is configured to store videos in a persistent store. For example, local database might store videos about how to clean gutters, how to adjust the thermostat, and how to adjust the sprinkler system. In an embodiment, local database and processor 106 is configured to link to and display web applications. For example, such web application can be a model of the physical objects of a person's home where the web application is communicably connected to the mobile device 110 and/or the other connected devices within range 112, so that information about these devices can be matched with their respective profiles and the appropriate, channeled video can be matched and alternatively displayed for the end-user. Or the end-user can communicate updated information about a device via the web application. Further, in an embodiment, local database and processor 106 is configured to obtain, process, or store device fingerprints, where device fingerprinting is a form of web tracking. For example, local database and processor 106 can be configured to identify a device or browser based on certain criteria, such as but not limited to IP address, timestamps, HTTP request headers, and so on.

In an embodiment, analytics engine 107 is configured to employ one or more of the following mathematical processes: regression models, tree-based methods, matrix factorizations, factorizations machines, Boltzmann machines, Markov chains, graphical models, clustering, deep learning and neural nets, linear discriminant analysis, and association rules. Certain parameters are updated on a continual basis, such as timestamps and device identifier (ID).

In an embodiment, the router and/or modem 105 are standard, current devices and need not be taught herein In an embodiment, mobile device 110 is a device that is configured with a digital camera and executable code or software that enables the end-user to take a photo of an appliance or other element of interest and communicate with either the STB/Host 104 or the back-end server 114 about such appliance or other element. For instance and as mentioned above, the end-user can take a photo of their gutters. The mobile device 110 is configured to identify and/or flag the gutters and display an appropriate instructional video about cleaning the gutters, where such video originated from the STB/Host storage 106. In an embodiment, mobile device 110 is configured to automatically link to such video and/or other related videos on the STB/Host 104 via communications component 102 for viewing there, or to upload such video and/or other related videos from the STB/Host 104 via communications component 102. In another embodiment, mobile device 110 is configured to upload such photo to the STB/Host 104 and/or to the back-end server, via communications component 102. Either or both of the STB/Host 104 and back-end server 114 are configured respectively with an analytics engine 107 and 117, each of which are configured to ingest the photo and subsequently identify and/or flag the gutters and, further, identify an appropriate instructional video about cleaning the gutters for display.

In an embodiment, the back-end server 114 is configured to have the hardware and/or software to perform the functions of a back-end server; to comprise a local storage (persistent or temporary or both) and one or more processors that are configured to execute instructions that are stored in memory (collectively or singularly referred to as component 116); to comprise a router and/or modem (collectively or singularly referred to as component 115); and an analytics engine that may include AI and/or ML capabilities 117. Sub-components (115, 116, and 117) may reside in the same server-device or may be distributed.

In an embodiment, STB/Host 104 is communicably connected to one or more other devices within range of premises 112. Such devices 112 comprise Internet of Things (IoT) devices that may have one or more sensor, such as for example temperature control devices, motion detection devices, or sound detection devices. The device within range 112 is configured to pair with software on the STB/Host (106 of 104). Informational data from the device 112 can be collected by the STB/Host 104, stored, and subsequently aggregated with other such data from other such devices, and possibly end-user behavioral data, and input into the analytics engine 107 for predicting an appropriate video to present to the end-user (e.g., on their mobile device 110, other registered smart devices, or STB/Host 104) for display. As well, in an embodiment, device 112 can be configured to be smart and receive data and/or signals for processing. For example, device 112 can be configured to be or have a controller processor that receives signals and performs operations, accordingly. As another example, device 112 can be configured to receive a signal or informational data and display results on a display (e.g., an LED panel), accordingly. Examples include but are not limited to thermostat devices, motion and/or audio detection device, such as home automation devices (e.g., Alexa Smart Home or Alexa-enabled devices by Amazon.com, Inc., Seattle, WA.

In an embodiment, satellite 118 (e.g., a geostationary satellite) is configured to communicate with (as shown logically by communications component 102) the STB/Host 104 by broadcasting a data direct broadcast satellite (DBS) 103 thereto. Satellite 118 can be further configured to communicate with mobile device 110 and or other devices 112. For example, satellite 118 can stream an educational video via DBS 103 directly to the mobile device 110 and/or directly to another device 112 within range of the STB/Host 104. As well, satellite 118 can be configured to stream an educational video via DBS 103 directly to another STB/Host 122, as discussed in further detail below. For instance, the educational video that is transmitted to STB/Host 122 can be intended for STB/Host 104 to view, as well as other STB/Hosts to view (represented collectively as STB/Host 122). It should be appreciated that DBS 103 communication line is represented in FIG. 1 logically as included in communications 102.

In an embodiment, one or more other STB/Host 122 is configured similarly as STB/Host 104. STB/Host 122 has the same type of ports, subcomponents, and capabilities. Such other STB/Host 122 can be configured to be in communication with STB/Host 104 via wireless communication as represented by communications 102. For example, STB/Host 122 can store an educational video and be configured to display or stream such education video on STB/Host 104, mobile device 110, or even another and different STB/Host 122, all communication via communications component 102.

In an embodiment, a third-party partner 120 is configured to communicate with the back-end server 114 for the purpose of receiving a request to provide an educational video and subsequently to transmit such educational video to the back-end server 114. The request and transmittal signals are performed via communications 102. After the back-end server 114 receives the transmitted video from the third-party partner 120, back-end server 114 subsequently transmits to or enables the video to be transmitted by satellite 118 for delivery to STB/Host 104. An example of such process is a third-party partner being requested, by the back-end server, for an educational video on using a new lawn mower safely. The third-party would then find and transmit such video to the back-end server as a response to the request, for ultimate delivery to the STB/Host. Consistent with embodiments herein, the educational video can be stored on external hard drives, flash memory, or other back-end server technologies, as well as internal storage.

Exemplary Implementations

It has been found that rural internet and satellite combined service can have a choke on the internet. In some cases, individuals do not have an internet connection or service in the first place. Sometimes end-users do not have very good speed. For others, having an internet service can be expensive. Thus, the innovation described herein leverages a satellite offering on which the satellite service provider can stream content and where the end-user also may have internet service. The innovation combines this configuration with this use case of people having a home device (external or internal) and wanting some how-to videos (e.g., educational video) or maintenance videos and the like (e.g., for a furnace or hot water heater) for such device. For instance, the end-user may want to know how to work on the brakes. Presently, end-users can search for such videos on YouTube or other video channel. However, consistent with embodiments herein, the system is configured to predictably load the educational videos transmitted over DBS to reduce the bandwidth of the delivery system that is very precious or valuable to the end-user, especially when it would otherwise need to be delivered over the internet.

An embodiment provides for when there is little to no internet available. In an embodiment, the STB (e.g., STB/Host 104) is configured to have a locally cached or locally retrievable set of information (e.g., in database 106) that can happen through the DBS 103 protocol or system. In an embodiment, database 106 is configured as a cache of stored information on the hard drive wherein a user can have access to that information. For instance, the stored information can be the educational video and the end-user would be sent to or directed to that file. It should be appreciated that the system 100 is configured so that the end-user, while having limited internet access, can perform text type searching. Also, in an embodiment, the system is configured to offer the end-user the opportunity to download content off the internet either at their leisure or at their technological capabilities. Suppose, for instance, they have dial-up internet speeds. It is well-known that an online video (e.g., a YouTube video) would probably consume a lot of bandwidth, which can be challenging for end-users with little or no internet. Thus, the innovation is configured to enable end-users to request that the system download a particular video(s). Subsequently, in however long it takes for that download to process, that download can take place behind the scenes or in the background. Then once the videos are ready, they are made accessible. For instance, the videos can be stored in database 106 and the analytics engine 107 can determine when to present such videos to the end-user. That is, in addition to using the satellite stream to transmit the video, the system is configured to use the hard drive on the STB (e.g., STB/Host 104) to archive the videos (e.g., in database 106) and deliver it in the most appropriate and efficient fashion by analytics engine 107 whether for the end-user or for the entity providing the service (e.g., back-end server 114 and satellite 118).

An embodiment incorporates videos or types of channels (e.g., content) that are predictive. For example, the innovation can be expanded into a type of global service that is already configured with the analytics that can determine what users searched for across the STB (e.g., STB/Host 104 or back-end database 118) or across their phone (e.g., mobile device 110) or other connected device (e.g., 112). The innovation is configured to process the searches and to make predictions thereupon (e.g., at analytics engine 107 or 117). For example, the system can learn that the end-user searched for certain types of topics, e.g. seasonal, or whether the searches pertain to that family, that neighborhood, or that community and then proactively bring targeted content (e.g., targeted educational videos) to their service over satellite (e.g., DBS 103) so that such content is made available to them. In accordance with embodiments herein, whatever is of interest to the end-users, the analytics engine is configured (e.g., analytics engine 107 or 117) to determine the content that is relevant to them. As an example, if a user buys an item, such as a new appliance in their house, then the system proactively pushes (e.g., from back-end server 114) information with the partnerships (e.g., third-party partner 120), with the retailer (e.g., third-party partner 120), or the OEM of the equipment (e.g., as transmitted by DBS 103), to their service (e.g., at STB/Host 104 and database 106) so that the end-user can have it at the ready.

In an embodiment, the educational videos can be transferred locally by a direct, non-internet link, such as Bluetooth, USB drives, or other types of storage devices. Thus, the predictive analytics engines 107 can communicate with the local storage 106 and suggest an educational video file from such storage for the purpose of presenting to the end-user (e.g., presenting via the STB/Host 104, mobile device 110, or other device 112).

In an embodiment, the local database (e.g., 106) at the STB/Host (e.g., STB/Host 104) is configured to store images from the mobile device (e.g., mobile device 110) and process such images using standard image processing methods. For example, the processor 106 and the analytics engine 107 can either or both be configured to perform image processing on the images stored locally. Performing such image processing locally helps the end-user with little or no internet service. In this embodiment, the analytics engine 107 or the processor 106 can predict or determine, in response to the image processing, the appropriate educational video to request to be transmitted via satellite (e.g., 118) over DBS (e.g., 103) to the end-user's STB/Host's 104 for display or storage for future display, or the appropriate educational video from the local storage 106 to display.

In another embodiment, the captured images are uploaded or transmitted (e.g., via communications 102) to the database at the back-end server (e.g., database 116 at back-end server 114). In this embodiment, the processor 116 and the analytics engine 117 can either or both be configured to perform image processing on the images stored in database 116. In this embodiment, the analytics engine 117 or the processor 116 can predict or determine, in response to the image processing, the appropriate educational video to transmit via satellite (e.g., 118) over DBS (e.g., 103) to the end-user's STB/Host's 104 for display or storage for future display.

In an embodiment, the STB/Host 104 is configured to share drives (e.g., local database 106) with similar drives of other STB/Hosts (e.g., STB/Host 122) that are communicably connected. For example, the STB/Hosts can be connected via the cellular 5G network (e.g., shown as communications 102). As an example, an end-user can be located in a neighborhood with 10 customers of the same product or system in that neighborhood. The embodiment does not require redundancies with the content that are proactively put on or transmitted to those drives (e.g., via DBS 103). In this example, the innovation can download some of the content on one drive and some content on another drive. Then the respective end-users (that is, their respective systems) can share such content through the network.

In an embodiment, the back-end server (e.g., back-end server 114) is communicably connected to one or more third-party partners (e.g., third-party partners 120) so that a request for a particular video, originating from the back-end server or from the STB/Host 104 through the back-end server, is transmitted to the third-party partner. Once that request goes through approvals and checks and balances in its signal path, then the video file is retrieved from the third-party partner (e.g., third-party 120) For example, the end-user can select or otherwise indicate that they want a particular video streamed or transmitted from the third-party partner via the satellite's DBS (e.g., DBS 103).

An embodiment incorporates augmented reality (AR) technology. More specifically, an AR overview is generated on the end-user's screen, shows the end-user what devices/house elements the system is tagging, and lets them enter additional information. For instance, the end-user can add text "our gutters are always clogged!" or "last car oil change was on Aug. 2, 2021". In accordance with an embodiment herein, the system is configured to ask the end-user for additional clarification (e.g., How old is your air-conditioning unit? a) Before 2014 B) After 2014 C) I don't know") or for more video/photos. For instance, analytics engine (e.g., analytics engine 107 or 117) can recognize that the end-user has a particular brand's refrigerator, but does not know the model or have data indicating the model. The system is configured to highlight, in a digital image, where the informational sticker on such type of refrigerator should be located and ask the end-user to point their camera there, to obtain model-type information about the particular refrigerator. Moreover, consistent with embodiments herein, an application facing the end-user is provided. For example, a mobile app or a web service on a phone, laptop, or STB is provided that gives people the option to login and edit or add notes directly on their phone on the app or on a web app or in their STB. That is, embodiments herein build and process a model of the physical parts of the user's home. The system can learn or be told where people might need help (e.g., via mobile device 110 or STB/Host 104). That information is matched up (e.g., by the analytics engine 107 or 117) with what the system already knows about the history of the physical parts of the home, what is learned about current local conditions (e.g., the weather), and end-user data (e.g., their notes or network traffic patterns). Thus, the innovation provides ease of use and efficiency (e.g., less internet bandwidth and less database storage requirements) by being configured to allow the user to walk around with a camera and performing the processes described above. This efficient aspect avoids the system requirement of relying on 100% image recognition to figure out what the objects such as the appliances are. The innovation allowed the system to send the end-user questions or let the end-user add notes, so that the system has the data. In an embodiment, the AR overlay includes the user pointing their camera at the living room, for example, and the system highlights the elements in the room that the system recognizes. The system is further configured so that, subsequently, the user can tell the system if something big or important is missing or wrong, such as for example the system thought the couch was a car. Thus, embodiments herein present a human option, human input. Thus, the user can make the correction right there. They can add their note and the system will ingest such informational data, process it, and store it for future use.

Figure 4:
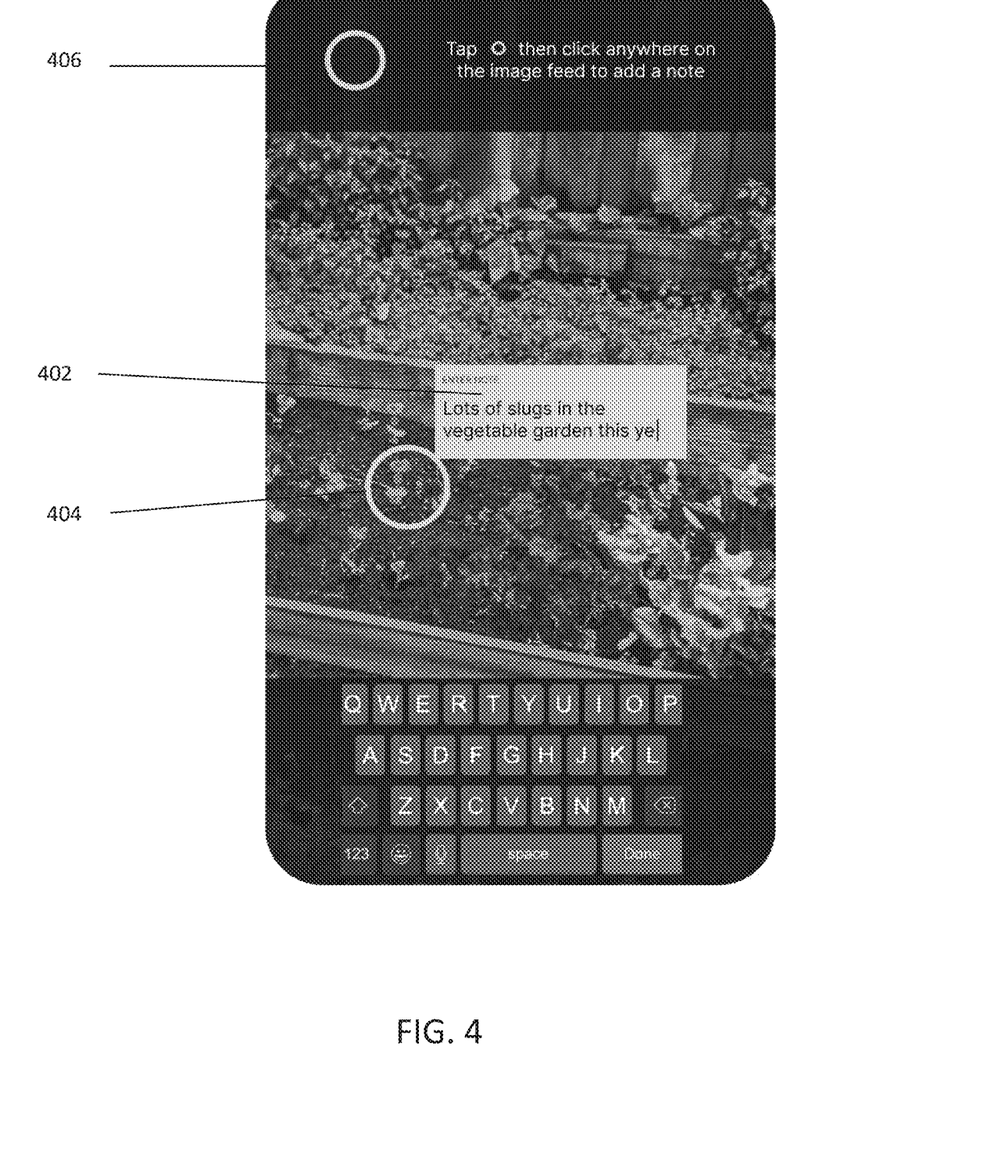
FIG. 4 is a sample screenshot showing an additional note initiated by the user, consistent with various embodiments.
Figure 5:
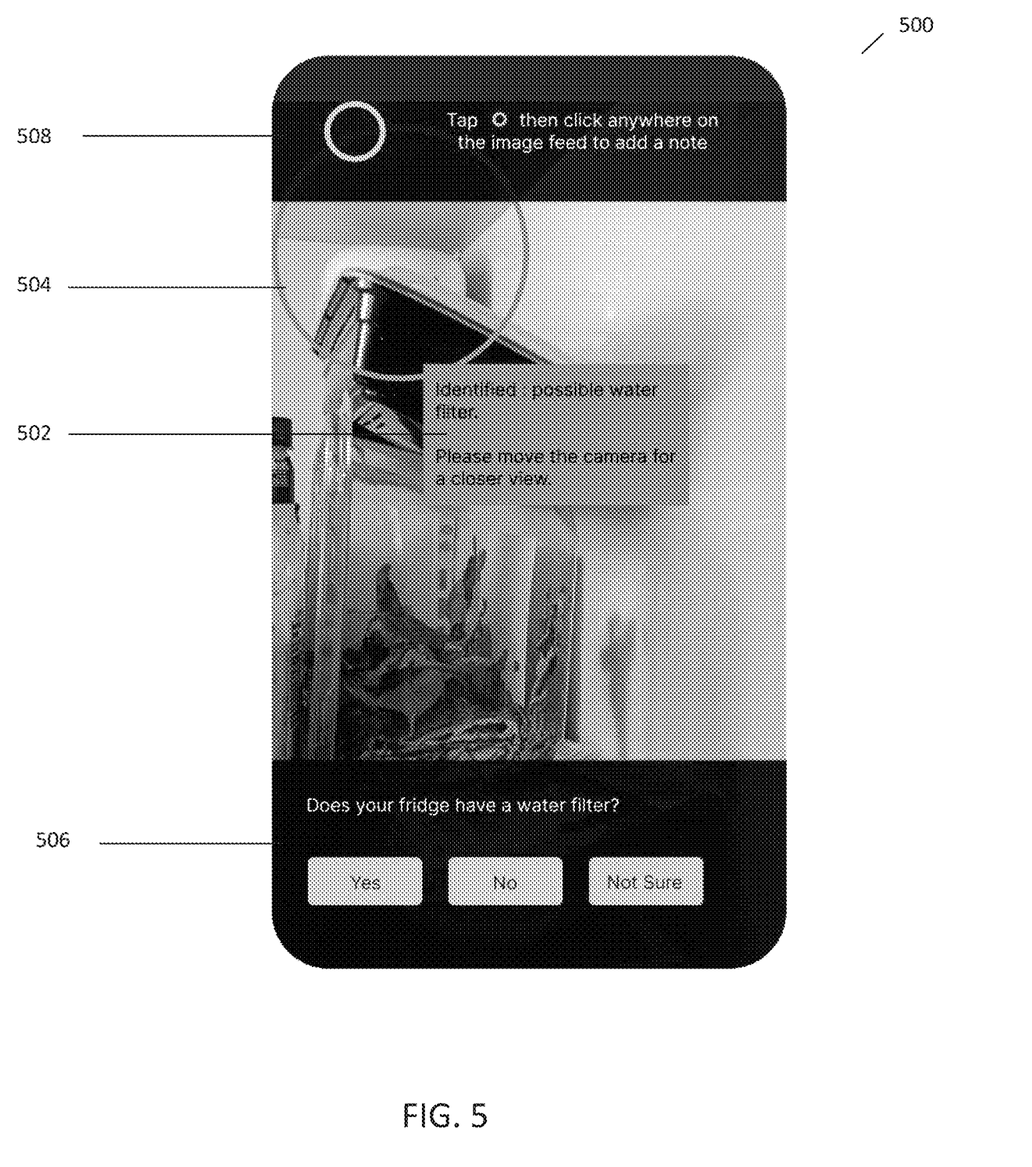
FIG. 5 is a sample screenshot showing user clarification requested by AI system, consistent with various embodiments.
Figure 6:
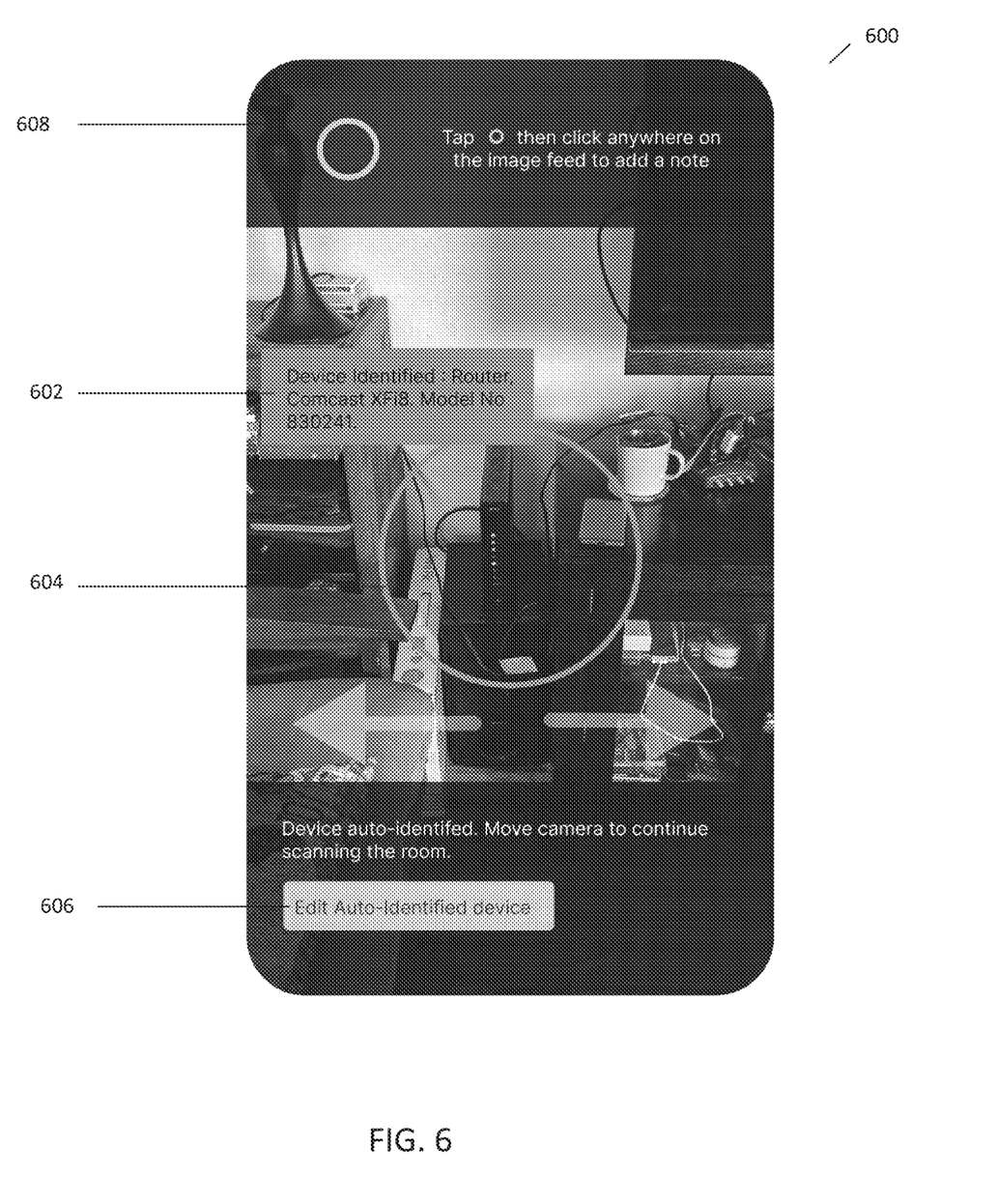
FIG. 6 is a sample screenshot showing an auto-identification notification, consistent with various embodiments.

Embodiments of AR overlays can be understood with reference to FIGS. 4-6, which show sample screenshots with such overlays. More specifically, FIGS. 4-6 show examples of the kinds of interactions with the AR overlay system where information about the house/appliances/other things that people might need instructional videos about is captured. These specific example screenshots show a mobile experience; however, other such devices are contemplated including but not limited to smart glasses and smart watches. In these examples, a user is holding their phone out in front of them, e.g., using the rear camera, and the image on the screenshots of FIGS. 4-6 is what their phone is pointing out. Predetermined or assigned graphical interface elements, such as for example yellow and orange boxes and shapes, are parts of the AR overlay. For instance, the system can be configured to display the AR overlays in yellow to show user-interactable elements and in orange to show notification-only elements.

Turning now to FIG. 4, the sample screenshot showing an additional note initiated by the user 400, at any point in time, the user can add an additional note 402 to any element on the screen 404, whether identified by the AI system or not. In this case, the AI system has not noticed yet that the camera is pointing at an early spring vegetable garden, but the user is in the middle of entering a note that they had a lot of problems with slugs in the vegetable garden. The user circled a plant in yellow 404 to indicate that that is the item to which they want to attach this note 402. In addition to saving the note, the AI system is prompted to look more carefully (e.g., apply image detection algorithms) at the user-selected part of the image, and use the additional information provided in the note (e.g., using natural language detection or identification algorithms) to help the system identify the image (e.g., as input to machine learning algorithms to identify and/or learn that the selected part of the screen contains a specific plant). Thus in this example, now that the AI system has detected or learned that the content is about a vegetable garden, the AI system is more likely to identify the part of the picture the user circled as a pea plant and send instructional videos next spring (for instance) that have to do with protecting pea seedlings from slugs. It should be appreciated that the system can be configured to display on the screen instructions for the user, as shown in overlay 406.

Turning now to FIG. 5, the sample screenshot showing user clarification requested by AI system 500, the AI system uses the (orange) overlay notifications (502 and 504) to highlight things that the system is unsure about 504 (e.g., cannot identify) and ask the user for clarification 502 (e.g., in the overlay text box or it is contemplated that the system can be configured to aurally ask the user to perform a function, such as move the camera closer to the circled object). In this case, the system detects to a measure of confidence that an element might be a refrigerator water filter, but that such element is partially obscured by (e.g., by a storage bin in the sample screenshot). The system circles the item of interest 504 (e.g., in orange), and instructs the user 502 to move the camera closer/get a better angle. In the sample screenshot, and in accordance with embodiments herein, the system overlays a popup 506 at the bottom for example to show another form the system could ask for user help. The popup 506 asks whether the refrigerator has a water filter and provides for three types of inputs: yes, no, and no sure. In this case, if the user marks that their fridge does not have a water filter, the system can remove the orange circle 504 and provide another overlay (e.g., replacing overlay 502), telling the user that the system does not need a closer look at that part of the fridge after all. It should be appreciated that the system can be configured to display on the screen instructions for the user, as shown in overlay 508.

Turning now to FIG. 6, the sample screenshot showing an auto-identification notification 600, this example screenshot shows the system using the AR overlay (502 and 504) to keep the user informed about what the system is seeing (e.g., image detecting). Specifically, in this example, the system thinks (e.g., has identified that) what is circled 604 (e.g., in orange) is the user's particular model of router (e.g., in text box 602). No user interaction is needed. If, however, the user disagrees with the system's assessment, the user can indicate such to the system such as for example by clicking the button 606 (e.g., in yellow), which here indicates "Edit Auto-Identified device", and entering more information, e.g., "actually that's my centurylink router" or "we don't use that—it's just a paperweight", etc. It should be appreciated that the system can be configured to display on the screen instructions for the user, as shown in overlay 608.

In an embodiment, the system is configured to recognize other connected devices (e.g., 122 and 112). The embodiment includes what can be referred to as the gateway, which is a device (e.g., STB/Host 104) that is an internet router, modem, and a STB. Such device is configured to have visibility into internet traffic as well as DBS traffic into and out of the vicinity (e.g., the house). Thus, in accordance with embodiments herein, other connected devices can be recognized visually as well as by their internet traffic. The system is configured to process post-recognition events. For example, the system can be configured to inform the model of the recognized devices for post-processing or send the customer a note that says, "Hey you have a nest fire alarm, can you tell us where it is?" Consistent with embodiments herein, smart devices or any device that sends an identification signal can be considered a connected device (e.g., 122 and 112). Examples of such devices can include but are not limited to: smart phones, tablets, VCRs (self-identifying model name, automatic clock setting using paired TV/OTA time sync signal), etc. Other such technologies considered include those utilizing dial-up, audio tones such as cue tones, or other types of technological triggering for multi-system actions to occur.

In an embodiment, a gateway includes a router, modem, and a STB as well as a significant amount of processing power (e.g., 106). As another example implementation, the gateway includes a computer, router, modem, STB, and a large hard drive for performing some of the AI processing locally. The gateway can also be considered a hub. Further, the gateway can be considered a data flow-through as in a single device that receives input from many different connection types (e.g., as described hereinabove) and processes or allows such disparate input to pass-through or otherwise makes such flows deliverable. Thus, embodiments herein are configured to enable many different devices to talk to each other, to whatever extent they are configured. In an embodiment, further to the system being configured to receive signals or data from such disparate sources is the system being configured to use such data to result in an educational video being shown or suggested (e.g., by the local analytics engine 107) or to request such education video to be streamed by DBS 103.

Further, an embodiment is configured to include technologies that identify other types of signals beyond networking and beyond IP. An example of such configuration includes utility sensors that identify different power levels of different devices and then takes the profiles of such different power levels of different devices and matches such profiles to the likelihood of the meaning of such profile. For example, such likelihood can differentiate between "is this a microwave oven" or "is this a convection oven"? Then, responsive to determining such likelihood, the configured system can select and present to the end-user the appropriate educational video (e.g., from local database 106 or to be streamed over DBS 103 from the cloud database 116).

Thus, in an embodiment, the system is configured to be a computer with a local archive or repository and to have the capability of a lot of processing power (e.g., on STB/Host 104.) The hub, the gateway, STB/Host 104 can be considered the central nervous system within the home that is configured to connect out to various pipes, such as but not limited to, broadband, satellite, cellular, cloud interactions, and the at-home connectivity amongst the devices: sensor, the phone, tablets, etc. In an embodiment, the STB/Host is the primary user interface, which also acts as a host, e.g., doubles as both storage and controller. Such STB/Host 104 is configured to work either as or with a gateway unit. In an embodiment, the gateway unit is within the home. It could be headless or headed, meaning it does not have to provide the service of powering a TV and present content on the TV, which would be headed. Such STB (e.g., STB/Host 104) could be headless and thus feed clients, where the clients are device/processors that run the video service or the other interactions enabled by the STB provider. The platform can be viewed as a combination of a headless and headed device. In an embodiment, the hub is a headless device that allows clients to interact with it.

In an embodiment, the first video loading is not out of the gate. For instance, the system may not be able to identify an appliance the first time the end-user obtains such appliance. As time progresses, however, the configured system creates a local repository (e.g., in database 106) of the video content, tutorials, or any other relevant media around that appliance. For example, videos about a type of car that the end-user has gets locally stored so that the end-user can repeat-view such video or other media periodically (e.g., year after year) when the end-user forgets how to perform a particular maintenance of such car (e.g., replace the windshield wipers properly). Having such videos stored on the STB/Host (e.g., 104) provides efficiency in reduction of required bandwidth to stream or download such video on demand and also helps the end-user who has little or no access to the internet. It should be appreciated that the system is configured to have local storage for videos that are expected to be viewed. As well, it should be appreciated that the identification/cataloguing of devices in the home might take some time to get used/accessed/identified within the system, e.g., when using device fingerprinting, or waiting for user confirmation of a low-confidence AI identification.

In an embodiment, a time stamp of the video is processed, for example by the analytics engine 107 (or possibly 117). Thus, embodiments herein can be implemented in an entertainment use case. For example, the system can be configured to detect that there are multiple users in a particular household. Further, the system can be configured to detect whether a particular user watched a video (e.g., a YouTube video) through to the end. The analytics engine can be configured to determine the likelihood that the particular user will want to show such video to someone else. Thus, the system determines whether to keep a local copy of such video. For instance, the system can be customizable by the end-user to indicate that the video be kept for a particular number of days. Alternatively, the system can be programmed to determine the number of days for which the video should be stored. It should be appreciated that when such video is being shown to the end-user at a later time, from the end-user's experience, the result should look exactly the same, that the video was available for showing. It should be appreciated that consistent with embodiments herein, the gateway is sitting between the view device (e.g., the STB or the mobile device) and the internet. So, when the end-user instructs their phone to pull up that funny video that they watched yesterday to show everyone, their phone goes to their router in the gateway (e.g., router 105) and instead of pulling the video from the source (e.g., from YouTube) and using up their data, the gateway just pulls the video from the hard drive and sends it straight back to the end-user's device. Such process can be considered as caching on a home hub rather than on a device level and allowing all the devices connected to the hub to pull such media locally so that the end-user is not draining their broadband pipe.

In some embodiments, some internet access is required. For example, there are configurations when obtaining a video or related metadata can be done via the internet. However, if the end-user does not have any internet access, then the system provides a kind of a base, base level videos, based on the end-user's location, weather, geographic criteria, time of year, etc. In an embodiment, some users may have no broadband access, but cellular access, which might be a premium. Thus, the system is configured for such users to process a first download (e.g., from YouTube), but not repeat the download. In another example, if the user has very limited internet (e.g., at home), the gateway (e.g., gateway 104) can signal an instruction to the user's cellphone over the Wi-Fi about or indicating the videos the gateway wants (e.g., what the analytics engine 107 computed). Following this example, the next time the user is near an internet access (e.g., Starbucks' Wi-Fi), the phone (e.g., mobile device 110) can store such wanted videos on their phone temporarily and then download them to the STB's database (e.g., 106) after when the user arrives at their premises.

An embodiment collects and processes viewer measurement data that are centered on people using their satellite box to watch TV; the system is configured to track the user's movements on the STB. Beyond that, the system is configured to work with other tracking data resources, e.g., the Google Nest. Some embodiments are configured to include set-top box health, which can be centered on products for satellite TV watching. The health functionality attracts data related to the specifications and the significant technological resources or requirements of devices. Performance can be included with set-top box health, that is with learning, detecting, or otherwise obtaining the hardware model ID, the appropriate firmware, the appropriate software, etc. Thus, embodiments herein are configured to process a mix or combination of these technologies. It should be appreciated that some of these technologies or processes may already be in use. Thus, the innovation herein can apply such technologies and processes in a new way to serve this purpose.

An embodiment is configured to allow the user to reschedule their videos based on what is known about the product/topic of the video in combination with whether the user watched it or not. For example, if the user watched a particular video about changing their snow tires on their specific model/year car, it has been found that a traditional recommendations algorithm would simply immediately start showing the user more "similar" content—even though the user most likely just changed their tires and do not want to see a multitude of more options for tire changing. In contrast, embodiments herein detect or recognize (e.g., by analytics engine 107) that such video or similar content would not be of interest at the time and are configured to only return to tire-changing videos in the next appropriate time (e.g., next spring).

Thus, the innovation empowers users to select what they want to do. For example, in accordance with embodiments herein, the system is configured to allow users to archive their recording or the system can proactively archive such recording. Further, embodiments herein allow the user to opt-in or opt-out of follow-up viewings of the video and/or viewings of relevant videos. Also, there is a limited amount of space on the user's STB, thus, embodiments herein allow the user to clean-up their storage, e.g., clean-up videos that they do not want to see going forward. For instance, the system can be configured to ask the user the following questions: are you happy with this video, would you like to see more options (e.g., winterizing your car). That is, the system can offer the user something for learning or obtaining direction relating to the original subject requested, but at a broader level. In an embodiment, the system can also include other data sources. For instance, the system can be configured to obtain the following information by asking: we just showed you how to put your winter tires on, please select form the following options: show me this video again in six months or show me this video again next Fall. The system can be configured to have default options. In this example, the system can default to October for the next showing of the video. Further, the system can be configured to override the default options by other-date driven analyses. In the same example, the system can determine that it snowed the first week of September (e.g., by monitoring the weather forecast or the weather application) and proactively push the winterizing videos out earlier without the user having to ask for such videos. That is, the system is configured to tie in external data sources such as the weather app with data based on past viewing or what the system or user has archived.

Figure 2:
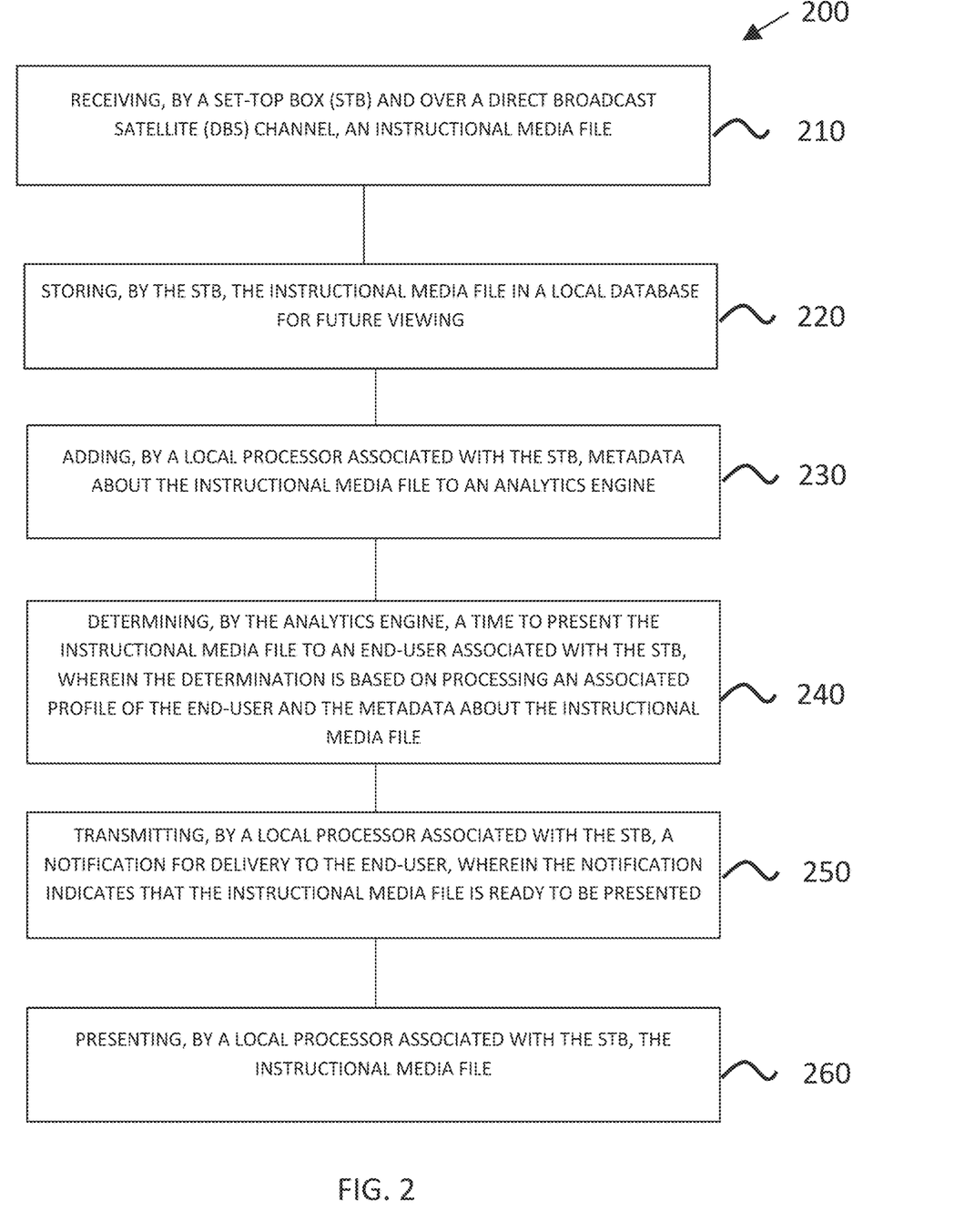
FIG. 2 is a flow diagram of a broadcast of a seasonally and geographically curated instructional media file over DBS, consistent with various embodiments.

An embodiment can be understood with reference to FIG. 2, a flow diagram 200 of a broadcast of a seasonally and geographically curated instructional media file over DBS.

At step 210, the method 200 includes receiving, by a set-top box (STB) (e.g., SET/Host 104 or STB 101) and over a direct broadcast satellite (DBS) channel (e.g., DBS 103 or Communications 102), an instructional media file.

At step 220, the method 200 includes storing, by the STB (e.g., SET/Host 104 or STB 101), the instructional media file in a local database (e.g., local database 106) for future viewing.

At step 230, the method 200 includes adding, by a local processor associated with the STB (e.g., processor 106 or 116), metadata about the instructional media file to an analytics engine (e.g., analytics engine 107 or 117).

At step 240, the method 200 includes determining, by the analytics engine (e.g., analytics engine 107 or 117), a time to present the instructional media file to an end-user associated with the STB, wherein the determination is based on processing an associated profile of the end-user (e.g., stored in local database 106 and possibly previously transmitted by back-end server 114 from local database 116) and the metadata about the instructional media file.

At step 250, the method 200 includes transmitting, by a local processor associated with the STB (e.g., processor 106 or 116), a notification for delivery to the end-user (e.g., at mobile device 110 or even at STB 101), wherein the notification indicates that the instructional media file is ready to be presented.

At step 260, the method 200 includes presenting, by a local processor associated with the STB (e.g., processor 106 and STB 101), the instructional media file.

Figure 3:
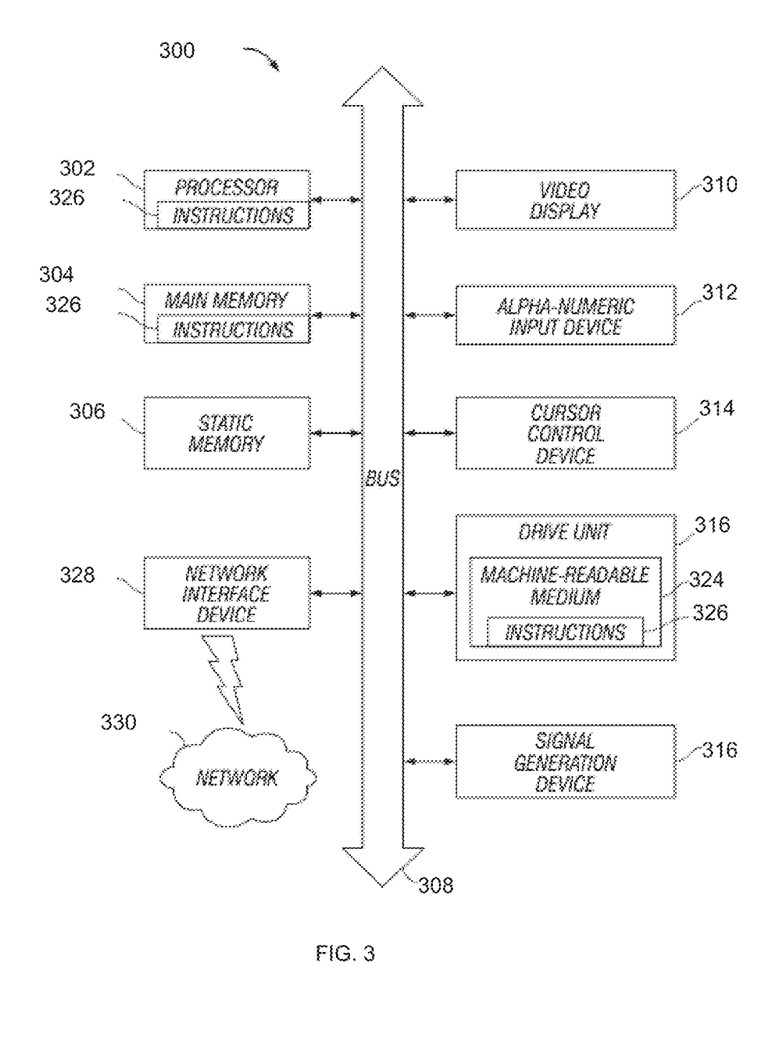
FIG. 3 is a block diagram illustrating components which, in some implementations, can be used in a system employing the disclosed technology.

FIG. 3 is a block schematic diagram of a machine in the exemplary form of a computer system 300 within which a set of instructions may be programmed to cause the machine to execute the logic steps of the invention. In alternative embodiments, the machine may comprise a network router, a network switch, a network bridge, personal digital assistant (PDA), a cellular telephone, a Web appliance or any machine capable of executing a sequence of instructions that specify actions to be taken by that machine.

The computer system 300 includes a processor 302, a main memory 304 and a static memory 306, which communicate with each other via a bus 308. The computer system 300 may further include a display unit 310, for example, a liquid crystal display (LCD) or a cathode ray tube (CRT). The computer system 300 also includes an alphanumeric input device 312, for example, a keyboard; a cursor control device 314, for example, a mouse; a disk drive unit 316, a signal generation device 318, for example, a speaker, and a network interface device 328.

The disk drive unit 316 includes a machine-readable medium 324 on which is stored a set of executable instructions, i.e. software, 326 embodying any one, or all, of the methodologies described herein below. The software 326 is also shown to reside, completely or at least partially, within the main memory 304 and/or within the processor 302. The software 326 may further be transmitted or received over a network 330 by means of a network interface device 328.

In contrast to the system 300 discussed above, a different embodiment uses logic circuitry instead of computer-executed instructions to implement processing entities. Depending upon the particular requirements of the application in the areas of speed, expense, tooling costs, and the like, this logic may be implemented by constructing an application-specific integrated circuit (ASIC) having thousands of tiny integrated transistors. Such an ASIC may be implemented with CMOS (complementary metal oxide semiconductor), TTL (transistor-transistor logic), VLSI (very large systems integration), or another suitable construction. Other alternatives include a digital signal processing chip (DSP), discrete circuitry (such as resistors, capacitors, diodes, inductors, and transistors), field programmable gate array (FPGA), programmable logic array (PLA), programmable logic device (PLD), and the like.

It is to be understood that embodiments may be used as or to support software programs or software modules executed upon some form of processing core (such as the CPU of a computer) or otherwise implemented or realized upon or within a machine or computer readable medium. A machine-readable medium includes any mechanism for storing or transmitting information in a form readable by a machine, e.g. a computer. For example, a machine readable medium includes read-only memory (ROM); random access memory (RAM); magnetic disk storage media; optical storage media; flash memory devices; electrical, optical, acoustical or other form of propagated signals, for example, carrier waves, infrared signals, digital signals, etc.; or any other type of media suitable for storing or transmitting information.

REMARKS

The above description and drawings are illustrative and are not to be construed as limiting. Numerous specific details are described to provide a thorough understanding of the disclosure. However, in some instances, well-known details are not described in order to avoid obscuring the description. Further, various modifications may be made without deviating from the scope of the embodiments.

Reference in this specification to "one embodiment" or "an embodiment" means that a particular feature, structure, or characteristic described in connection with the embodiment is included in at least one embodiment of the disclosure. The appearances of the phrase "in an embodiment" (or the like) in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not for other embodiments.

The terms used in this specification generally have their ordinary meanings in the art, within the context of the disclosure, and in the specific context where each term is used. It will be appreciated that the same thing can be said in more than one way. Consequently, alternative language and synonyms may be used for any one or more of the terms discussed herein, and any special significance is not to be placed upon whether or not a term is elaborated or discussed herein. Synonyms for some terms are provided. A recital of one or more synonyms does not exclude the use of other synonyms. The use of examples anywhere in this specification, including examples of any term discussed herein, is illustrative only and is not intended to further limit the scope and meaning of the disclosure or of any exemplified term. Likewise, the disclosure is not limited to various embodiments given in this specification. Unless otherwise defined, all technical and scientific terms used herein have the same meaning as commonly understood by one of ordinary skill in the art to which this disclosure pertains. In the case of conflict, the present document, including definitions, will control.

As used herein, the term "and/or" when used in the phrase "A and/or B" means "A, or B, or both A and B." A similar manner of interpretation applies to the term "and/or" when used in a list of more than two terms.

From the foregoing, it will be appreciated that specific embodiments of the invention have been described herein for purposes of illustration, but that various modifications may be made without deviating from the scope of the invention. Accordingly, the invention is not limited except as by the appended claims.

We claim:

1. A method, comprising:
   receiving, by a set-top box (STB) and over a direct broadcast satellite (DBS) channel, an instructional media file,
      wherein the STB is part of a gateway, and
      wherein the gateway comprises a local database, at least one local processor, a router and/or modem for communicating with other gateways, and an analytics engine;
   storing, by the STB, the instructional media file in the local database for future viewing;
   adding, by the at least one local processor associated with the STB, metadata about the instructional media file to the analytics engine;
   determining, by the analytics engine, a time to present the instructional media file to an end-user associated with the STB, wherein the determination is based on processing an associated profile of the end-user and the metadata about the instructional media file;
   transmitting, by the at least one local processor associated with the STB, a notification for delivery to the end-user, wherein the notification indicates that the instructional media file is ready to be presented; and
   presenting, by the at one local processor associated with the STB, the instructional media file.

2. The method of claim 1, wherein the instructional media file is about an appliance, the method further comprising:
   independently detecting, by the analytics engine, the time for the instructional media file should be presented to the end-user, the detecting based on the associated profile of the end-user and the metadata about the instructional media file;
   retrieving the instructional media file from the local database for presenting to the end-user; and
   requesting additional information about the appliance as user-input from the end-user.

3. The method of claim 1, further comprising:
   receiving a digital image from a mobile device having a profile associated with the STB;
   performing image processing on the digital image and subsequently recognizing an object on the digital image;
   responsive to recognizing the object, flagging the object, the flagging to comprise by adding an overlay check or flag over the object for observation by the end-user.

4. The method of claim 3, wherein the flagging further comprises:
   adding a programmed indicator associated with the object;
   notifying the analytics engine of the programmed indicator associated with the object; and
   responsive to receiving the notification of the programmed indicator associated with the object, retrieving from the local database, an instructional media file that is associated with the object and that is delivered to the end-user for display.

5. The method of claim 1, further comprising:
   detecting, at the gateway, device fingerprinting information from devices whose signals are accessible to the gateway;
   responsive to detecting the device fingerprinting information, identifying one or more devices and their respective particular details including make and model; and
   responsive to identifying the one or more devices and their respective details, retrieving from the local database one or more appropriate instructional media files for display, each of which file is associated with the one or more devices.

6. The method of claim 1, further comprising:
   detecting and recognizing, at the gateway, traffic patterns of devices whose signals are accessible to the gateway;
   responsive to detecting and recognizing the traffic patterns, processing appropriate predictions, including identifying one or more corresponding instructional media files; and
   responsive to identifying the one or more corresponding instructional media files, retrieving from the local database the one or more appropriate instructional media files for display.

7. The method of claim 1, further comprising:
   establishing a partnership with a third-party partner;
   detecting that a product or service was purchased from an account associated with the end-user;
   responsive to detecting that the product or service was purchased, receiving over the DBS an appropriate instructional media file originating from the third-party partner.

8. The method of claim 1, further comprising:
   rescheduling delivery, availability, or presenting of the instructional media file based on:
      informational data about product or topic of the instructional media file in combination with whether the instructional media file has been viewed by the end-user, or
      overriding user-input.

9. The method of claim 1, further comprising:
   communicating continuously with other devices in an area; and
   determining traffic patterns based on the communication with the other devices.

10. The method of claim 1, wherein the instructional media file is a seasonally or geographically-relevant how-to media file.

11. A system, comprising:
    one or more processors; and
    one or more memory devices having stored thereon instructions that when executed by the one or more processors cause the one or more processors to:
       receive, by a set-top box (STB) and over a direct broadcast satellite (DBS) channel, an instructional media file,
          wherein the STB is part of a gateway, and
          wherein the gateway comprises a local database, at least one local processor, a router and/or modem for communicating with other gateways, and an analytics engine;
       store, by the STB, the instructional media file in the local database for future viewing;
       add, by the at least one local processor associated with the STB, metadata about the instructional media file to the analytics engine;
       determine, by the analytics engine, a time to present the instructional media file to an end-user associated with the STB, wherein the determination is based on processing an associated profile of the end-user and the metadata about the instructional media file;
       transmit, by the at least one local processor associated with the STB, a notification for delivery to the end-user, wherein the notification indicates that the instructional media file is ready to be presented; and
       present, by the at least one local processor associated with the STB, the instructional media file.

12. The system of claim 11, wherein the instructional media file is about an appliance, wherein the instructions further comprise:
- to independently detect, by the analytics engine, the time for the instructional media file should be presented to the end-user, the detecting based on the associated profile of the end-user and the metadata about the instructional media file;
- retrieving the instructional media file from the local database for presenting to the end-user; and
- to request additional information about the appliance as user-input from the end-user.

13. The system of claim 11, wherein the instructions further comprise:
- to receive a digital image from a mobile device having a profile associated with the STB;
- to perform image processing on the digital image and subsequently recognizing an object on the digital image;
- responsive to recognizing the object, to flag the object, the flagging to comprise by adding an overlay check or flag over the object for observation by the end-user.

14. The system of claim 11, wherein the instructions further comprise:
- to establish a partnership with a third-party partner;
- to detect that a product or service was purchased from an account associated with the end-user;
- responsive to detecting that the product or service was purchased, to receive over the DBS an appropriate instructional media file originating from the third-party partner.

15. One or more non-transitory computer-readable media storing computer-executable instructions that, when executed by one or more processors, cause the one or more processors to perform operations comprising:
- receiving, by a set-top box (STB) and over a direct broadcast satellite (DBS) channel, an instructional media file,
  - wherein the STB is part of a gateway, and
  - wherein the gateway comprises a local database, at least one local processor, a router and/or modem for communicating with other gateways, and an analytics engine;
- storing, by the STB, the instructional media file in the local database for future viewing;
- adding, by the at least one local processor associated with the STB, metadata about the instructional media file to the analytics engine;
- determining, by the analytics engine, a time to present the instructional media file to an end-user associated with the STB, wherein the determination is based on processing an associated profile of the end-user and the metadata about the instructional media file;
- transmitting, by the at least one local processor associated with the STB, a notification for delivery to the end-user, wherein the notification indicates that the instructional media file is ready to be presented; and
- presenting, by the at one local processor associated with the STB, the instructional media file.

16. The one or more non-transitory computer-readable media of claim 15, wherein the instructional media file is about an appliance, the operations further comprising:
- independently detecting, by the analytics engine, the time for the instructional media file should be presented to the end-user, the detecting based on the associated profile of the end-user and the metadata about the instructional media file;
- retrieving the instructional media file from the local database for presenting to the end-user; and
- requesting additional information about the appliance as user-input from the end-user.

17. The one or more non-transitory computer-readable media of claim 15, wherein the operations further comprise:
- receiving a digital image from a mobile device having a profile associated with the STB;
- performing image processing on the digital image and subsequently recognizing an object on the digital image;
- responsive to recognizing the object, flagging the object, the flagging to comprise by adding an overlay check or flag over the object for observation by the end-user.

* * * * *

UNITED STATES PATENT AND TRADEMARK OFFICE
CERTIFICATE OF CORRECTION

PATENT NO. : 11,849,194 B1
APPLICATION NO. : 17/839782
DATED : December 19, 2023
INVENTOR(S) : Caroline Condon et al.

It is certified that error appears in the above-identified patent and that said Letters Patent is hereby corrected as shown below:

In the Claims

Claim 1, Column 19, Line 25, after "at" insert --least--;

Claim 15, Column 21, Line 39, delete "modern" and insert --modem--;

Claim 15, Column 22, Line 15, after "at" insert --least--.

Signed and Sealed this
Twentieth Day of February, 2024

*Katherine Kelly Vidal*

Katherine Kelly Vidal
*Director of the United States Patent and Trademark Office*